(12) United States Patent
McConnell

(10) Patent No.: US 11,330,601 B2
(45) Date of Patent: May 10, 2022

(54) WIRELESS COMMUNICATIONS NETWORKS

(71) Applicant: BluWireless Technology Limited, Bristol (GB)

(72) Inventor: Raymond Mark McConnell, Bristol (GB)

(73) Assignee: BluWireless Technology Limited, Bristol (GB)

(*) Notice: Subject to any disclaimer, the term of this patent is extended or adjusted under 35 U.S.C. 154(b) by 75 days.

(21) Appl. No.: 16/970,802

(22) PCT Filed: Feb. 20, 2019

(86) PCT No.: PCT/EP2019/054254
§ 371 (c)(1),
(2) Date: Aug. 18, 2020

(87) PCT Pub. No.: WO2019/162351
PCT Pub. Date: Aug. 29, 2019

(65) Prior Publication Data
US 2021/0112564 A1    Apr. 15, 2021

(30) Foreign Application Priority Data

Feb. 25, 2018   (GB) ..................... 1803007

(51) Int. Cl.
*H04W 4/00*       (2018.01)
*H04W 72/08*      (2009.01)
(Continued)

(52) U.S. Cl.
CPC ........ *H04W 72/082* (2013.01); *H04B 7/0617* (2013.01); *H04W 72/0453* (2013.01)

(58) Field of Classification Search
CPC ............ H04W 72/082; H04W 72/0453; H04B 7/0617
(Continued)

(56) References Cited

U.S. PATENT DOCUMENTS

2003/0153294 A1    8/2003  Hata
2011/0193739 A1*   8/2011  Strauch ............... G01S 13/0209
                                                              342/146
(Continued)

FOREIGN PATENT DOCUMENTS

EP     2096781 A1    9/2009
EP     2901605 A1    8/2015
(Continued)

*Primary Examiner* — Thai D Hoang
(74) *Attorney, Agent, or Firm* — Optimus Patents US, LLC

(57) ABSTRACT

A method of mitigating start-of-packet interference in a millimetre waveband wireless mesh communications network which comprises a first plurality of network node devices each having a transceiver unit which includes a beamforming antenna device, and a second plurality of millimetre waveband wireless communications links each of which interconnects a respective pair of the transceiver units of the network node devices, the method comprising: allocating respective baseband centre frequencies to pairs of transceivers of the network node devices, which baseband centre frequencies are for use with respective communications links of the network, each such allocated baseband centre frequency being offset from at least one other allocated baseband centre frequency by a respective predetermined offset amount; and at a first transceiver of a selected pair of transceivers, encoding a data packet using an encoding signal having the baseband centre frequency allocated to the selected pair of transceivers, to generate an encoded signal.

14 Claims, 14 Drawing Sheets

(51) Int. Cl.
*H04B 7/06* (2006.01)
*H04W 72/04* (2009.01)

(58) Field of Classification Search
USPC ............... 370/329–330, 335–345, 400–406
See application file for complete search history.

(56) References Cited

U.S. PATENT DOCUMENTS

| | | |
|---|---|---|
| 2017/0079041 A1 | 3/2017 | Raustia |
| 2020/0112372 A1* | 4/2020 | Nishimoto ....... H04B 10/25753 |
| 2020/0358470 A1* | 11/2020 | Dayan ...................... H04B 1/40 |
| 2021/0235285 A1* | 7/2021 | Guerena ................. H04W 4/46 |
| 2021/0281453 A1* | 9/2021 | Ota ...................... H04L 5/0048 |

FOREIGN PATENT DOCUMENTS

| | | |
|---|---|---|
| GB | 2552960 A | 2/2018 |
| GB | 2552960 A1 | 2/2018 |
| WO | 2009066986 A1 | 5/2009 |
| WO | 2009066986 A2 | 5/2009 |
| WO | 2010123700 A1 | 10/2010 |
| WO | 2014049326 A1 | 4/2014 |
| WO | 2014077673 A1 | 5/2014 |

\* cited by examiner

WIRELESS COMMUNICATIONS NETWORKS

The present invention relates to wireless communications networks, and in particular to wireless mesh communications networks.

BACKGROUND OF THE INVENTION

FIG. 1 of the accompanying drawings illustrates a simplified example wireless mesh communications network which comprises a plurality of network node devices 10 interconnected by bidirectional wireless communications links 12. The network node devices 10 operate to communicate with one another, for the transfer of communications data therebetween. This type of network is known as a "mesh" network and employs the multiple connections between network node devices that defines a mesh of communications links 12.

Wireless mesh networks are strong candidates to provide data communications, for example for Internet access, or for backhaul data traffic from small cell base stations. This is primarily because such wireless mesh networks require no cabling and can be deployed and extended in a flexible manner. Transmission and routing of data packets in a wireless mesh network is affected by many factors, including wireless link quality. This is particularly the case with outdoor networks in which the link quality can be affected by many different outdoor factors such as weather or other signal attenuating and blocking factors. In addition, low latency and low packet drop are highly desirable in such networks, since consumers desire high quality, high speed services, particularly for the delivery of online content over the wireless network. Early wireless mesh networks employed Wi-Fi technology with omnidirectional antenna but are no longer able to meet the data throughput rates (measured across the mesh from one edge node to another) of today's data traffic requirements. In addition, such techniques are subject to interference as the unlicensed 5 GHz band becomes more congested. This has led to interest in high speed millimetre wave wireless networks, such as those operating in the 60 GHz waveband, for example as defined in the Institute of Electrical and Electronic Engineers (IEEE) Standard IEEE 802.11ad. Such networks offer much higher capacity than the Wi-Fi mesh networks by exploiting large carrier bandwidth and (steerable) directional antenna to give high signal to noise ratios.

US2017/0079041 discloses a radio communication system wherein partly overlapping frequency blocks may be allocated to a communication apparatus.

In a wireless mesh network, various modes of interference can occur, either between network nodes, or between transceivers in a network node device. A significant interference mode is one that causes start of packet (SoP) detection errors in a receiver. As will be described below, a severe SoP interference mode can be caused by an interfering signal being treated as a start of packet on an expected or wanted transmission. Such treatment causes the network transceiver concerned to enter a packet detection and decoding process which only allows the transceiver to return to reception mode upon completion of the decode process. In the case when an erroneous packet is misinterpreted as the correct data packet, then delay and packet loss occurs due to the time taken to decode and discard the erroneous packet.

Accordingly, it is desirable to provide an improved technique that can address the drawbacks of previously-considered transmission techniques in wireless mesh communications network.

SUMMARY OF THE INVENTION

Various aspects of the present invention are set out in the following description and in the attached claims.

In accordance with the principles of the present invention, baseband centre frequencies allocated to communications links in a wireless mesh communications network are offset from one another by frequency offset values, in order to mitigate start-of-packet detection interference. The frequency offset values are typically very small relative to the bandwidth and/or symbol rate of the communication links, and specifically are typically less than a fifth of the channel bandwidth and/or symbol rate. Such a technique is particularly suitable for use in a millimetre wave wireless network, such as that defined by IEEE standard 802.11ad, operating in the 60 GHz waveband.

According to one aspect of the present invention, there is provided a method of mitigating start-of-packet interference in a millimetre waveband wireless mesh communications network which comprises a first plurality of network node devices each having a transceiver unit which includes a beamforming antenna device, and a second plurality of millimetre waveband wireless communications links each of which interconnects a respective pair of the transceiver units of the network node devices, the method comprising allocating respective baseband centre frequencies to pairs of transceivers of the network node devices, which baseband centre frequencies are for use with respective communications links of the network, each such allocated baseband centre frequency being offset from at least one other allocated baseband centre frequency by a respective predetermined offset amount; and at a first transceiver of a selected pair of transceivers, encoding a data packet using an encoding signal having the baseband centre frequency allocated to the selected pair of transceivers, to generate an encoded signal; wherein at least some data packets transmitted in the mesh communications network comprise detection data sequences for detection of the data packets by a receiver, and the respective predetermined offset amount is such that a correlation between a detection data sequence and version of the detection data sequence that is frequency offset by the respective predetermined offset is below a detection threshold for the detection data sequence.

One example method further comprises, at the first transceiver modulating a radio frequency signal at a carrier frequency with the encoded signal, to generate a transmission signal, controlling a beamforming antenna device of the transceiver to enable transmission therefrom in a predetermined transmission direction, and transmitting the transmission signal from the beamforming antenna device in the predetermined transmission direction.

Such a method may also comprise, at a second transceiver of the selected pair of transceivers receiving the transmission signal at the beamforming antenna of the second transceiver as a received signal, demodulating the received signal with a radio frequency signal at the carrier frequency, to generate a received encoded signal, decoding the received encoded signal using a decoding signal having the baseband centre frequency allocated to the selected pair of transceivers.

The step of allocating respective baseband centre frequencies may be performed at least partially by a central network resource of the communications network.

The step of allocating respective baseband centre frequencies may be performed at least partially by a media access controller (MAC) of each network node device.

In some embodiments, the predetermined offset amount is less than a tenth of a bandwidth of the communication links. The bandwidth of the communication links may be a channel bandwidth for a frequency channel of the communication network.

In some embodiments, the predetermined offset amount is less than 20% or 5% of a bandwidth of the communication links.

In some embodiments, the base band centre frequency is no more than 5%, 10%, or 20% of a bandwidth of the communication links.

In some embodiments, the communication links uses single carrier modulation.

The single carrier modulation may be a modulation of data symbols onto a single carrier frequency. The carrier frequency may be the same for all data symbols transmitted in the frequency channel. The communication links may specifically use Quadrature Amplitude Modulation (QAM), including e.g. BPSK and/or QPSK.

In some embodiments, the first transceiver may modulate a radio frequency carrier signal with the encoded signal to generate a transmission signal, the modulating applying a frequency translation of the encoded signal by a value equal to a carrier frequency being a centre frequency of a frequency channel of the millimetre waveband wireless mesh communications network.

In some embodiments, the encoded signal may be modulated onto a radio frequency carrier having a carrier frequency of a centre frequency of a frequency channel of the millimetre waveband wireless mesh communications network. This may generate a transmission signal which may be transmitted from the first transceiver in a beam of the beamforming antenna device. The modulating operation includes a frequency shift or translation of the encoded signal equal to the carrier frequency.

At least some data packets transmitted in the mesh communications network comprise detection data sequences for detection of the data packets by a receiver, and the respective predetermined offset amount is such that a correlation between a detection data sequence and a version of the detection data sequence frequency offset by the respective predetermined offset is below a detection threshold for the detection data sequence.

In some embodiments, the predetermined offset amount is less than a fifth of a symbol rate of the data packet.

In some embodiments, the predetermined offset amount is less than 10% or 5% of a symbol rate of the data packet.

In some embodiments, the baseband centre frequency is less than 20%, 10% or 5% of a symbol rate of the data packet.

According to another aspect of the present invention, there is provided a millimetre waveband wireless mesh communications network comprising a first plurality of network node devices each having a transceiver unit which includes a beamforming antenna device, a second plurality of millimetre waveband wireless communications links which interconnect respective pairs of transceiver units of the network node devices, and a baseband centre frequency allocation unit operable to allocate respective baseband centre frequencies to pairs transceivers of the network node devices, which baseband centre frequencies are for use with respective communications links of the network, each such allocated baseband centre frequency being offset from at least one other allocated baseband centre frequency by a respective predetermined offset amount, wherein a first transceiver of a selected pair of transceivers is operable to encode a data packet using an encoding signal having the baseband centre frequency allocated to the selected pair of transceivers, to generate an encoded signal; and at least some data packets transmitted in the mesh communications network comprise detection data sequences for detection of the data packets by a receiver, and the respective predetermined offset amount is such that a correlation between a detection data sequence and version of the detection data sequence that is frequency offset by the respective predetermined offset is below a detection threshold for the detection data sequence.

In one example, the first transceiver of the selected pair of transceivers is further operable to modulate a radio frequency carrier signal with the encoded signal, to generate a transmission signal, to control a beamforming antenna device of the transceiver to enable transmission therefrom in a predetermined transmission direction; and to transmit the transmission signal from the beamforming antenna device in the predetermined transmission direction.

In one such example, a second transceiver of the selected pair of transceivers is operable to receive such a transmission signal at the beamforming antenna of the second transceiver as a received signal, to demodulate such a received signal with a radio frequency signal at the carrier frequency, to generate a received encoded signal, and to decode such a received encoded signal using a decoding signal having the baseband centre frequency allocated to the selected pair of transceivers.

In one example, the baseband centre frequency allocation unit is at least partially provided by a central network resource.

In one example, the baseband centre frequency allocation unit is at least partially provided by a media access controller of each network node device.

DETAILED DESCRIPTION OF THE
PREFERRED EMBODIMENTS

Figure 1:
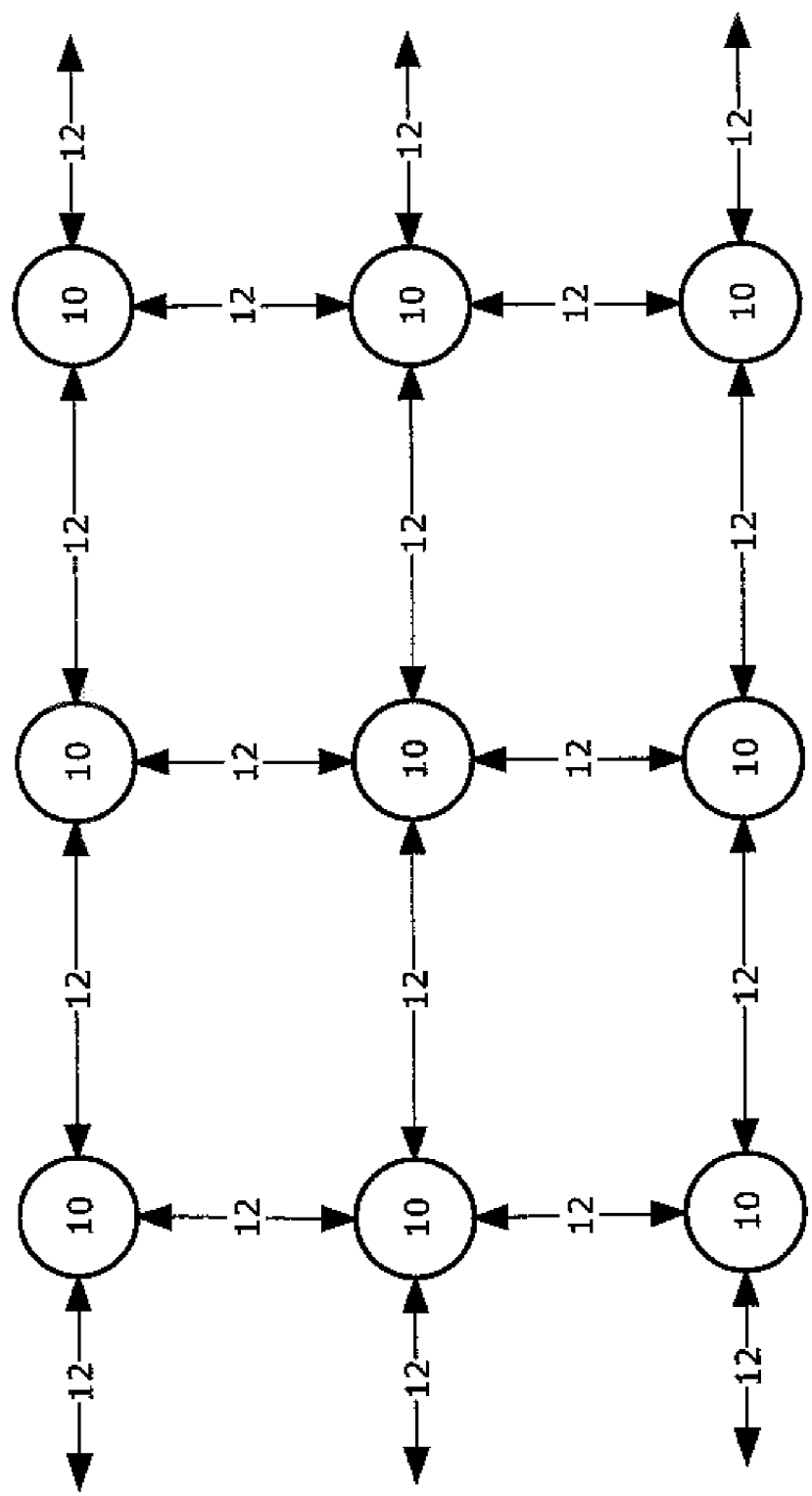
FIG. 1 is a schematic block diagram illustrating a wireless mesh communications network.
Figure 2:
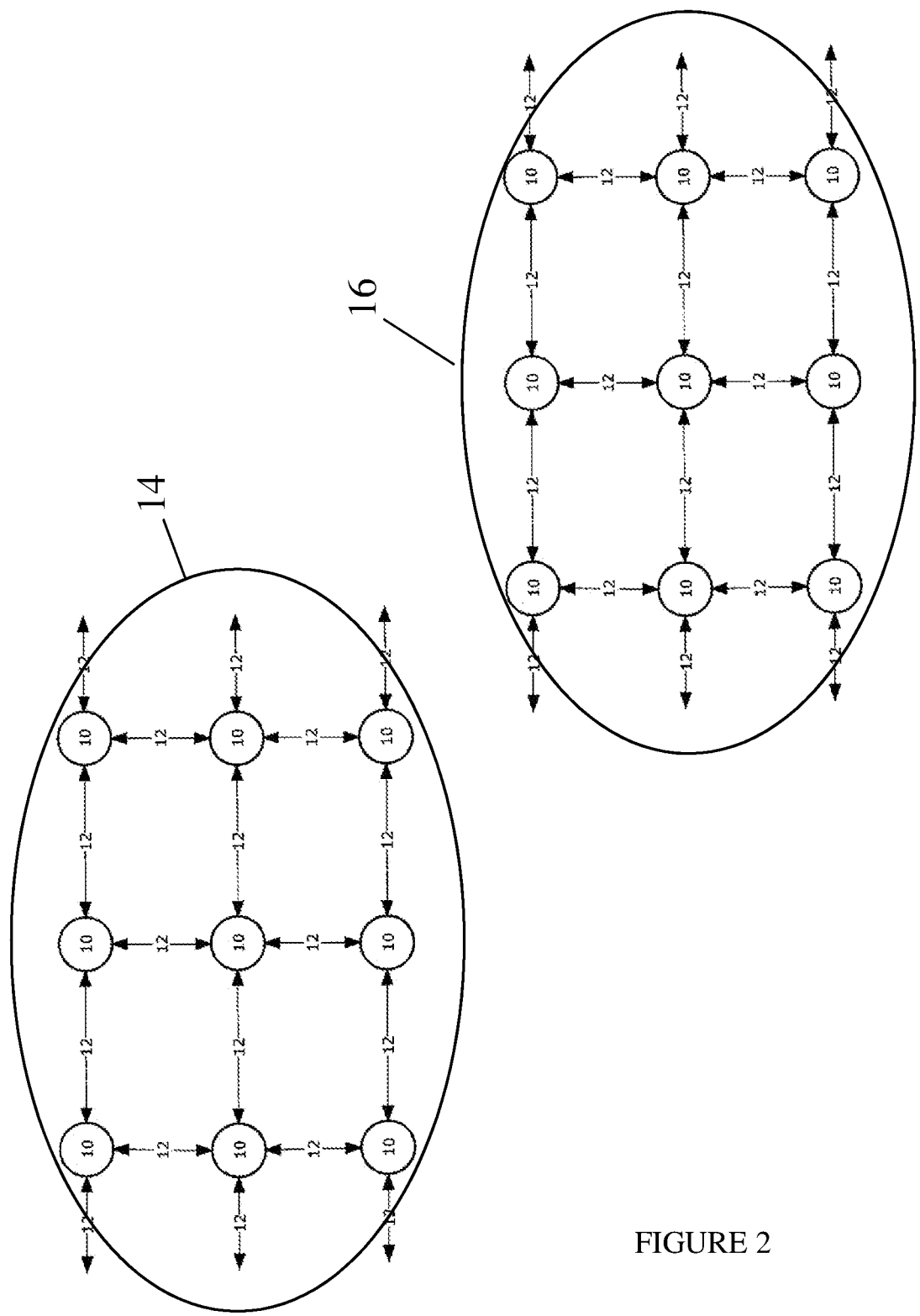
FIG. 2 is a schematic block diagram, illustrating two adjacent wireless mesh communications networks.

FIG. 1 illustrates an "ideal" grid-like mesh communications network in which the network node devices 10 are arranged in a regular, predictable grid. As such, organisation of the network node devices 10 is into a usable, optimal or near optimal communications topology. As mentioned above, FIG. 1 illustrates a simplified example wireless mesh communications network which comprises a plurality of network node devices 10 interconnected by bidirectional wireless communications links 12. The network node devices 10 operate to communicate with one another, for the transfer of communications data therebetween. This type of network is known as a "mesh" network and uses multiple connections between network node devices that defines a mesh of communications links 12. FIG. 2 illustrates a pair of adjacent mesh communications networks 14 and 16, each being in line with the mesh network of FIG. 1. FIG. 2 is intended to illustrate that different mesh networks may be adjacent one another.

It will be readily appreciated that the actual layout and arrangement of network node devices in a practical example of a wireless mesh communications network may vary considerably from the ideal grid-like mesh shown in FIGS. 1 and 2. It will also be readily appreciated that any one network node device 10 may communicate with all or only some of the network node devices adjacent thereto.

Figure 3:
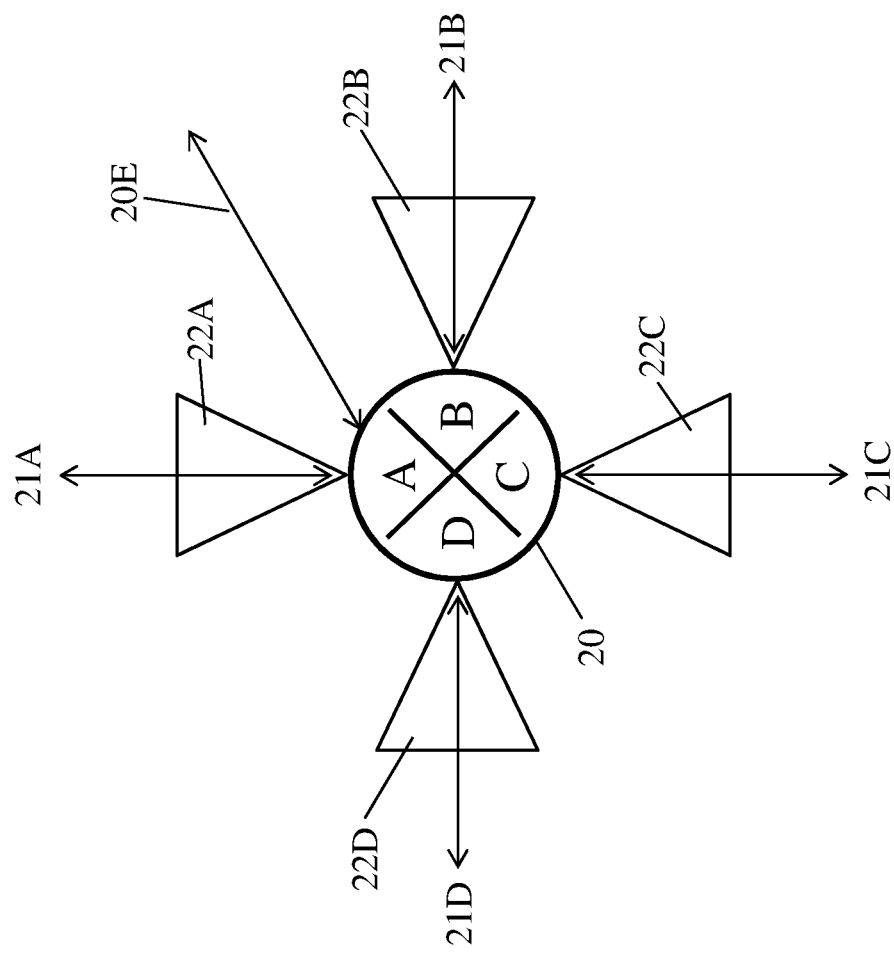
FIG. 3 illustrates a multi-antenna network node device.

FIG. 3 illustrates schematically a multi-antenna, multi-direction network node device. The network node device 20 of FIG. 3 has four transmitting and receiving antenna units 20A, 20B, 20C and 20D, and an external network connection 20E. Each antenna unit is operable to receive and transmit data packets over a beam forming directional antenna. Each antenna has a nominal central direction 21A, 21B, 21C or 21D, and is able to communicate over a range of directions indicated in FIG. 3 by 22A, 22B, 22C and 22D. In transmission mode, each antenna unit is operable to receive data packets for transmission, to modulate those data packets to generate modulated signals, and to transmit the modulated signals from the antenna device in a direction determined by the wireless communications link. In reception mode, the antenna unit is operable to receive detected modulated signals from the antenna device, to demodulate such received signals, and to supply demodulated data packets for further processing and routing. It will be readily appreciated that the network node device illustrated in FIG. 3 is exemplary. Other example network node devices may have numbers of transmitting and receiving units other than the four units shown in FIG. 3. For example, a network node device may have fewer than four units or may have more than four units. Operation of a network node device is not affected by the number of transmitting and receiving units contained in the network node device.

Figure 4:
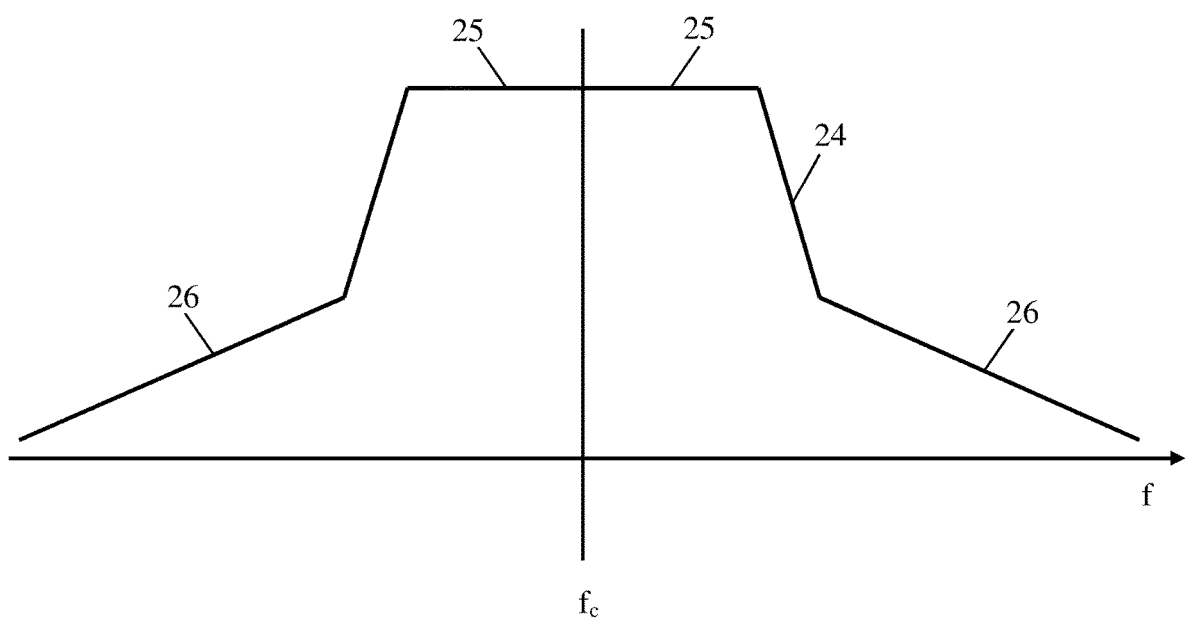
FIG. 4 illustrates a carrier frequency spectrum mask for a channel in a wireless mesh communications network.

FIG. 4 illustrates a carrier frequency spectrum mask 24 for a channel in a wireless mesh communications network. The spectrum mask 24 is centred on the centre frequency $f_c$ allocated to the particular channel in the waveband concerned and defines the relative amplitude of modulated signals on the channel. Thus, the described mesh communication system uses a number of frequency channels for wireless communication where each frequency channel is associated with/(partially) described by a centre frequency. Each frequency channel may further be defined by a bandwidth and/or a frequency bandwidth. The use of multiple frequency channels may allow for frequency division where simultaneous communications can use different frequency channels with, typically, low cross-interference.

However, in the mesh communications network, there are only relatively few frequency channels, such as e.g. only four channels of which even only one or two may be used. Accordingly, a large amount of interference suppression is achieved by a spatial separation of the signals. This may in particular be achieved due to the high carrier frequencies (e.g. around 60 GHz). It is further achieved through the use of beam forming directional antennas that can be used to restrict transmissions to relatively narrow spatial beams, and thus reduce the spatial spread and enhance the spatial interference suppression.

Radio communication in the mesh communications network, is performed using a single carrier modulation approach. Thus, when transmitting a data packet, the transceiver will modulate all data of this data packet onto the same single carrier, and thus the carrier frequency will be the same for all transmissions for a specific communication link between two transceivers. The communication links may specifically use QAM modulation, including for example BPSK or QPSK modulation (or higher order QAM symbol constellations).

In the example of FIG. 4, the spectrum mask 24 shows that a channel has a portion 25 to each side of the centre frequency $f_c$ that is allowed to be at full amplitude, with the allowed amplitude 26 ramping down as the frequency spread increases away from the centre frequency $f_c$. The spectrum mask 24 is intended to reduce or prevent interference between adjacent channels in a multi-channel system, by limiting the amplitude of the allowed modulated signals away from the centre frequency of the channel.

Any number of (frequency) channels may be defined for any particular system. In the millimetre waveband structure governed by IEEE standard 802.11ad, four radio channels having respective centre frequencies at 58.32 GHz, 60.48 GHz, 62.64 GHZ and 64.80 GHz are defined. Any number of these channels may be utilised, and typically one or two channels are used in a practical wireless mesh network application. A commonly used channel is the one centred on 60.48 GHz. In the IEEE 802.11ad standard, the width of the channel is defined as 1.08 GHz to each side of the centre frequency (that is, 2.16 GHz channel width centred on the centre frequency $f_c$).

Thus, in such systems, only a very low number of frequency channels are available and much of the interference management and suppression is achieved via spatial separation, which is significantly enhanced by the use of directional antennas.

Figure 5:
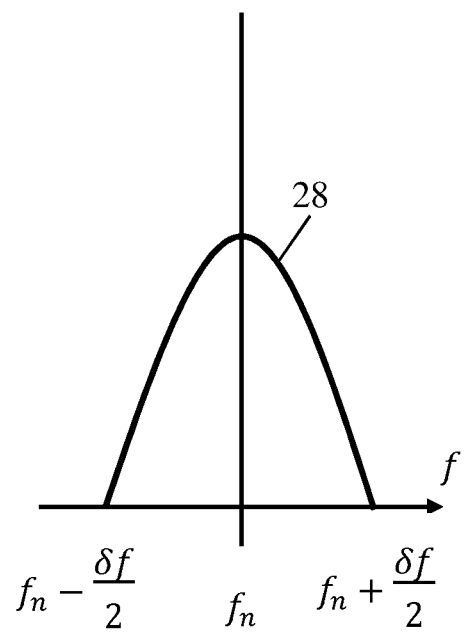
FIG. 5 illustrates a baseband signal used for encoding data in a wireless mesh communications network.

As will be described below, data to be transmitted in such a wireless mesh network is encoded using an encoding signal at a baseband frequency band (where the encoding using the encoding signal comprises frequency shifting a 0 Hz centred baseband signal by a predetermined frequency offset (which is typically very small)). FIG. 5 illustrates such a baseband frequency band 28, having a centre frequency $f_0$. The baseband has a band width of ½δf to each side $f_0$ the centre frequency $f_0$, so has a bandwidth of δf. The bandwidth of δf is chosen in relation to the spectrum mask of the carrier frequency (shown in FIG. 4). In the IEEE 802.11ad example, the baseband frequency band has a bandwidth of 1.76 GHz.

Figure 6:
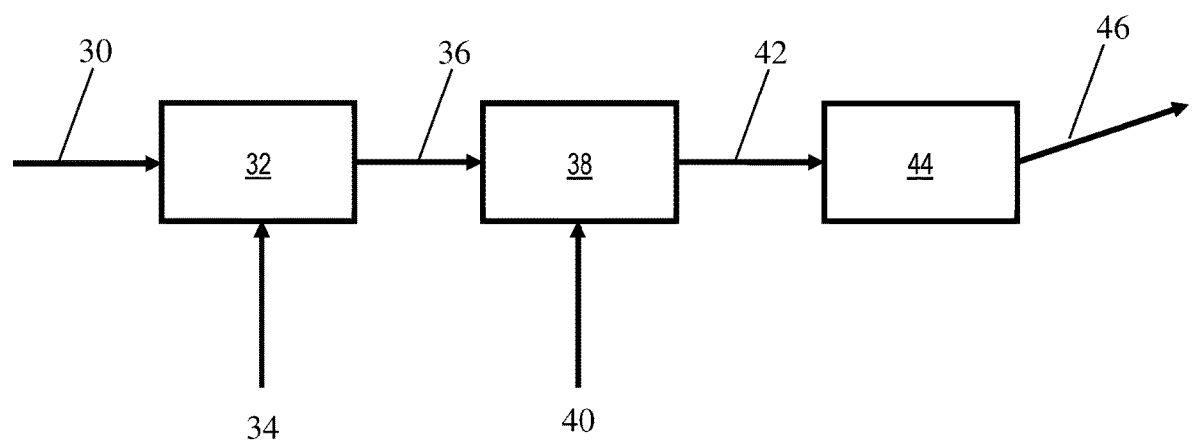
FIG. 6 illustrates a simplified schematic block diagram of a transmitter for use in the network node device of FIG. 3.

FIG. 6 is a schematic block diagram of a very simplified transmitter for use in a wireless mesh network node device as shown in FIG. 3. The transmitter receives a digital data stream 30, in the form of a series of discrete data packets of known structure and length. An encoder unit 32 receives the data stream 30 and encodes this data stream using a baseband encoding signal 34 in order to generate an encoded signal 36 centred on the baseband centre frequency $f_0$. This encoding comprises applying a frequency shift such that the resulting encoded signal is a baseband signal with a centre frequency close to zero (relative to the symbol rate, data rate and/or bandwidth of the base band signal/data stream). Thus, if the data stream is considered a base band signal with a centre frequency of 0 Hz, the baseband encoding signal 34 may have a frequency of the baseband centre frequency $f_0$ such that when this is used to encode the data stream, the resulting encoded signal 36 is an offset baseband signal with a baseband centre frequency of $f_0$.

The encoding may specifically comprise generating QAM symbols for the data stream 30 and frequency shifting the QAM symbols to a base band centre frequency of $f_0$.

This encoded signal 36 is supplied to an RF mixer 38 which modulates a radio frequency carrier signal 40 with the encoded signal 36, in order to generate a transmission signal 42. The transmission signal is a modulated signal corresponding to the offset base band signal at the centre frequency $f_c$ of the channel concerned. The modulation accordingly applies a frequency translation or shift of the encoded signal by a value equal to a centre frequency of a frequency channel of the mesh communications network. The resulting centre frequency for the modulated encoded signal will be $f_c+f_0$. A beamforming directional antenna 44 receives the transmission signal 42 and transmits a radio frequency signal 46 over the air in a specified direction to a receiver.

A baseband signal having a baseband centre frequency different from 0 Hz may also be referred to as an offset baseband signal or just an offset signal or offset low frequency signal. The baseband centre frequency may also be referred to simply as a centre frequency, and specifically as a centre frequency for an offset baseband signal or just an offset signal or offset low frequency signal.

Figure 7:
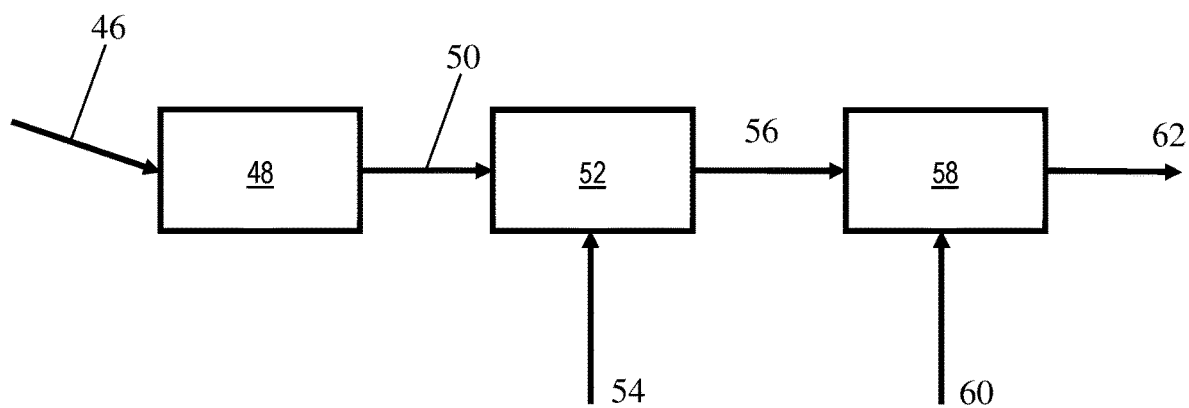
FIG. 7 illustrates a simplified schematic block diagram of a receiver for use in the network node device of FIG. 3.

FIG. 7 is a schematic block diagram of a very simplified receiver for use in a wireless mesh network node device as shown in FIG. 3. The receiver has a beamforming directional antenna 48 that receives the transmission signal 46 from a transmitter, and supplies this as a received signal 50 to a demodulator 52. The demodulator 52 operates to demodulate the received signal 50 with reference to a carrier reference signal 54 at the carrier centre frequency $f_f$. The demodulator 52 specifically includes a frequency translation of the received transmission signal 46 by a value corresponding to the carrier centre frequency $f_c$.

The resulting demodulated, encoded signal 56 at the baseband frequency is supplied to a detector and decoder 58. The operation of the detector and decoder 58 will not be described here in detail for the sake of clarity. The detector and decoder 58 uses a baseband reference signal 60, at the baseband centre frequency $f_0$ to demodulate, detect and decode the encoded signal 56 in order to produce a decoded data stream 62 for further processing. The detector and decoder 58 may thus reverse the frequency shift that was performed by the encoder unit 32.

It will be readily appreciated that the transmitter of FIG. 6 and the receiver of FIG. 7 are greatly simplified in order to demonstrate the principles of the present invention in a clear and simplified manner. It will be appreciated that specific elements of the transmitter and receiver, for example the modulator, demodulator and antenna, operate in accordance with known practice. It will also be appreciated that the transmitter and receiver may be provided by a transceiver device in which various components are shared.

The precise nature and configuration of the transmitter and receiver are outside of the scope of this document.

Figure 8:
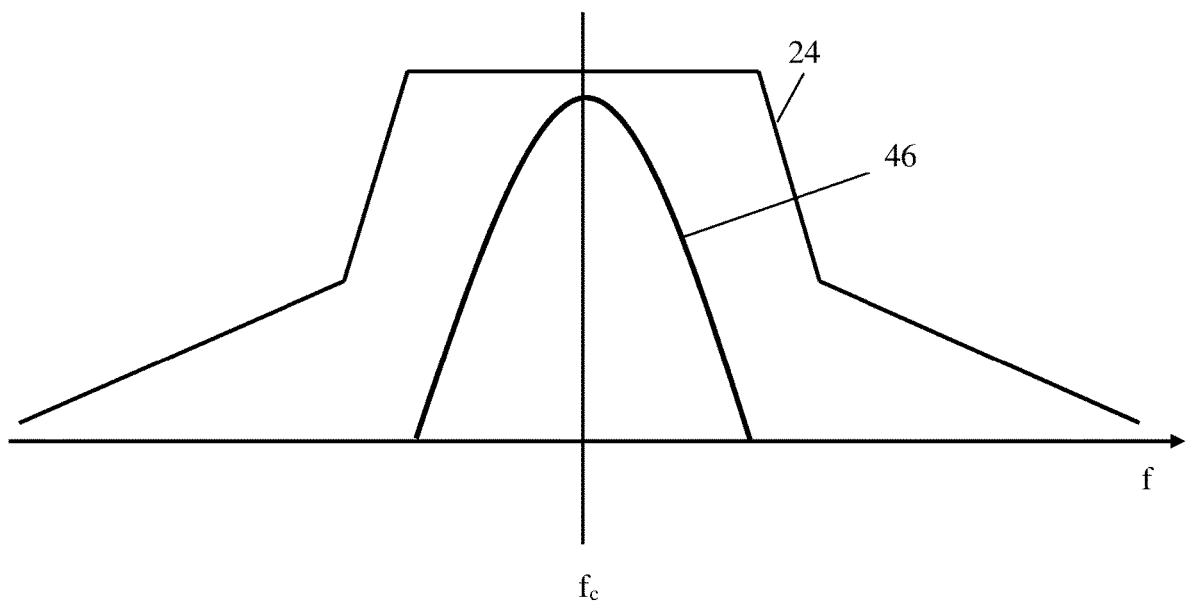
FIG. 8 illustrates a modulation of a carrier frequency with reference to the spectrum mask of FIG. 4.

FIG. 8 illustrates the transmission signal 46 with reference to the spectrum mask 24 of the radio channel being utilised. The transmission signal 46, which is a modulated carrier signal centred on the channel centre frequency $f_c$, is arranged to make as much use of the allowed amplitude range as possible, dependent upon over the air channel conditions, and on encoding and modulation techniques employed.

Figure 9:
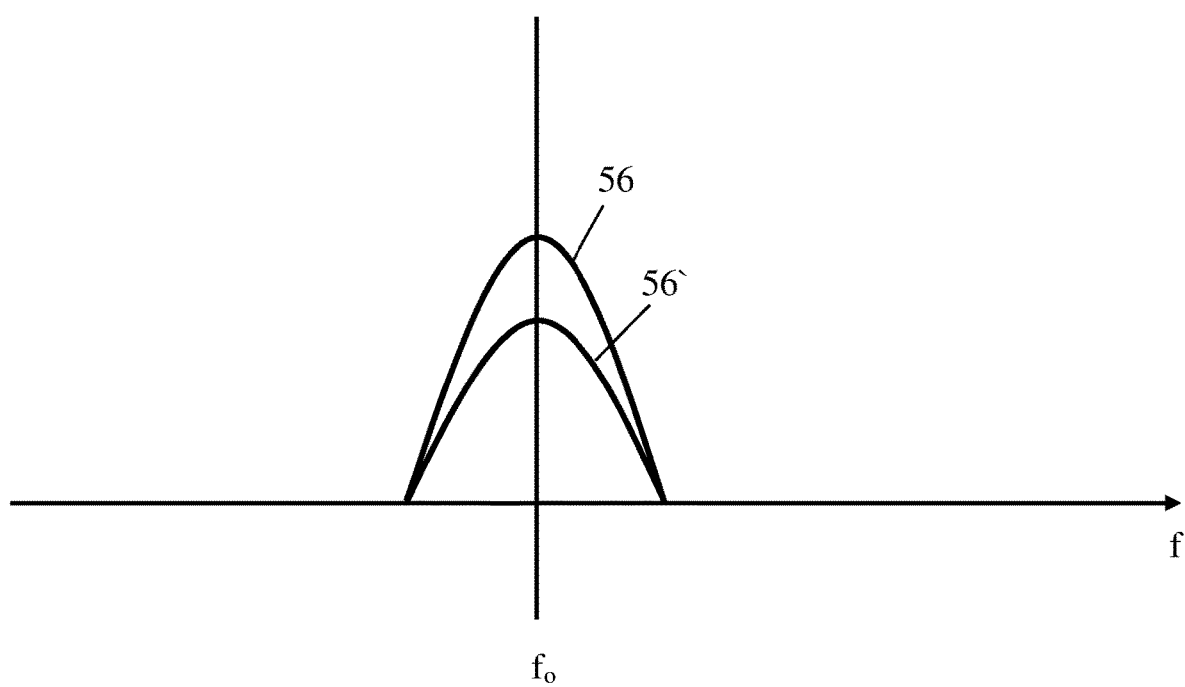
FIG. 9 illustrates received signal interference.

FIG. 9 illustrates the encoded signal 56 resulting from demodulation of a received signal 50 by the demodulator 52.

FIG. 9 further illustrates the possible result of the receiver receiving a transmission signal not intended for that receiver. Such interference modes will be described below but can occur when two transmitter/receiver pairs operate on the same network channel. One receiver detects a signal intended for another receiver, which results in the receiver demodulating the wrong received signal to produce an erroneous encoded signal 56'.

When such an error occurs, and the erroneous encoded signal is detected as a start of packet (SoP) signal, the receiving network node device operates to decode the identified data packet and cannot be arranged to receive the correct data packet from the correct transmitter until the decoding of the identified erroneous data packet has been completed. As such, severe start-of-packet interference results in significant delays and data packet loss.

Figure 10:
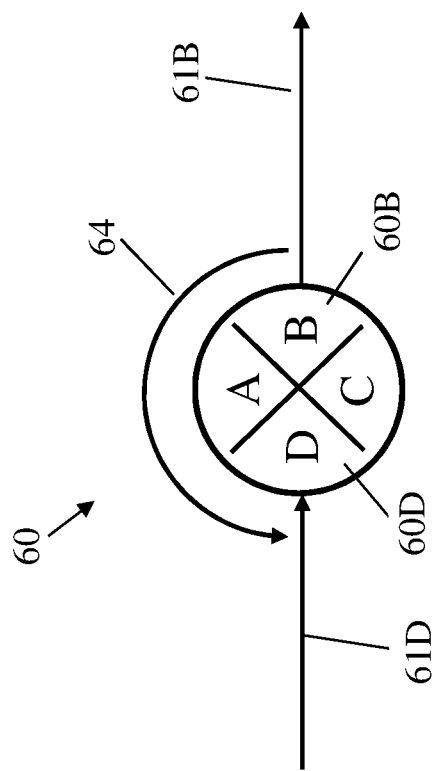
FIG. 10 illustrates an interference mode of a network node device.
Figure 11:
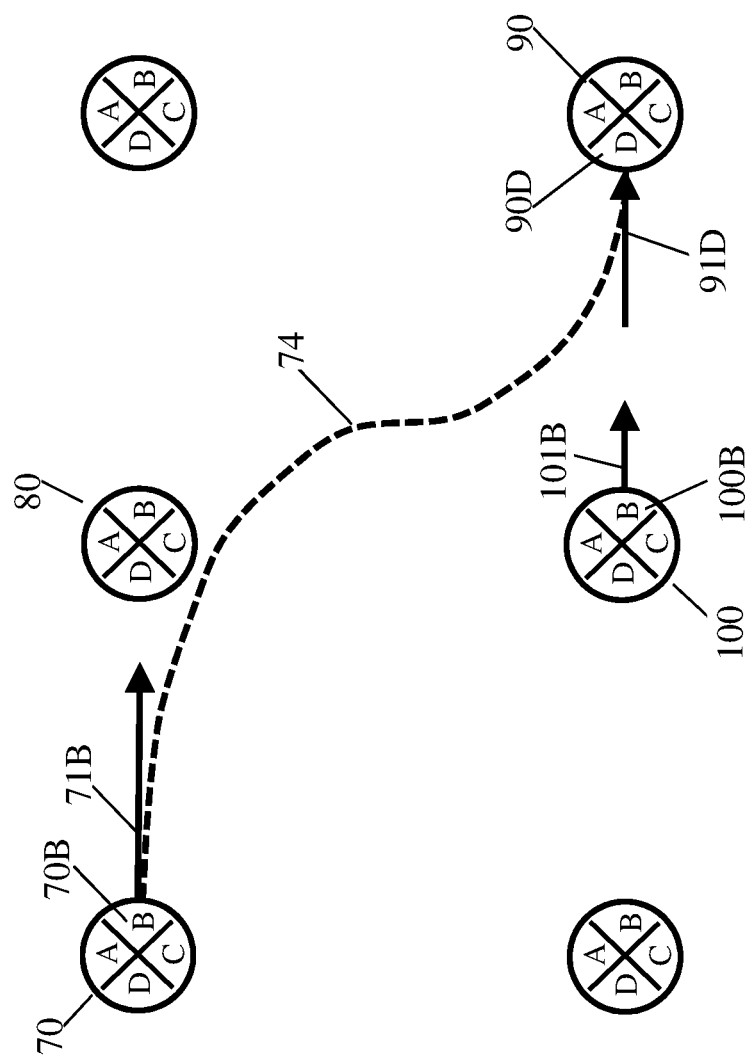
FIG. 11 illustrates an intra-network interference mode.
Figure 12:
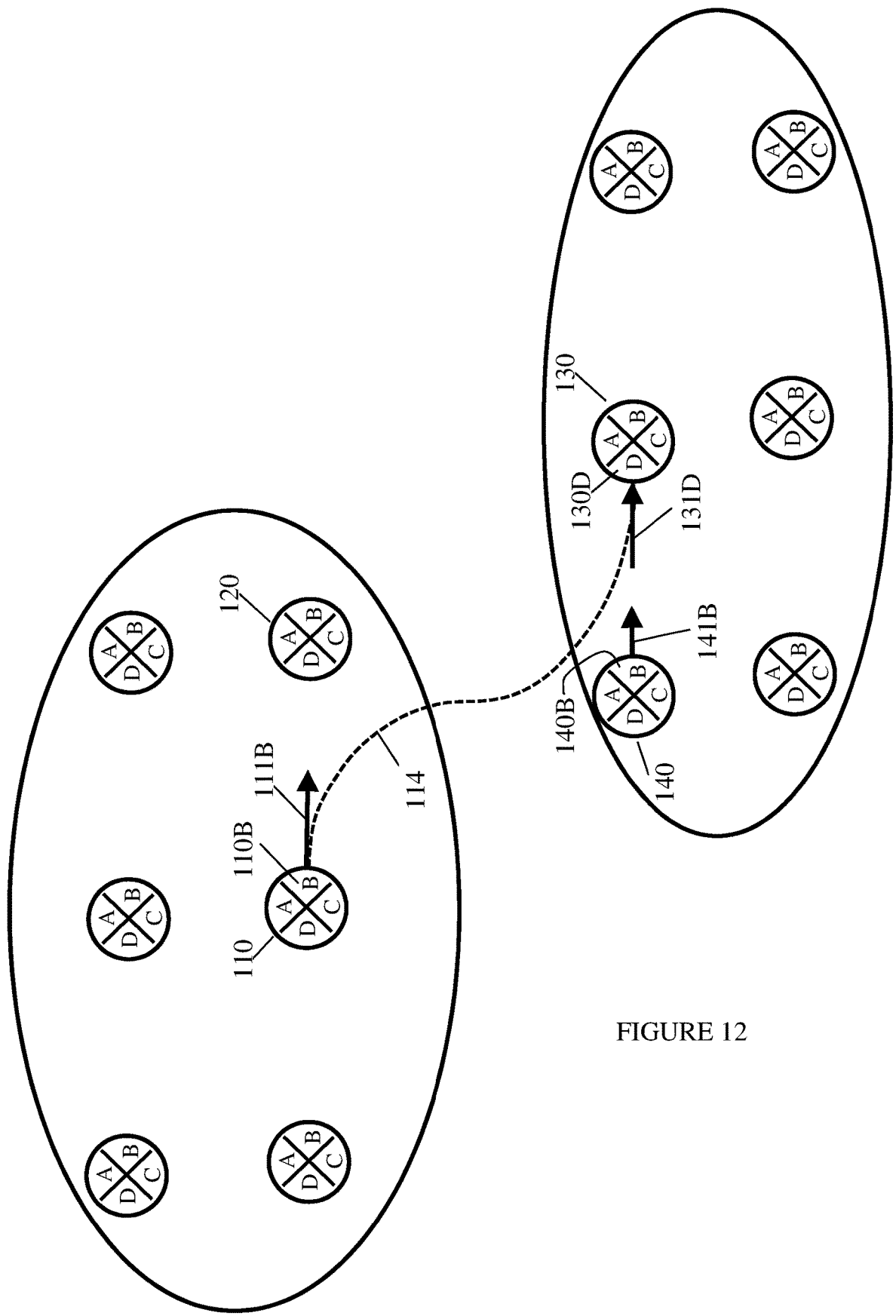
FIG. 12 illustrates an inter-network interference mode.

When there are relatively few channels available in a mesh network having a relatively large number of network node devices, such as those networks shown in FIGS. 1 and 2, transmission from a first transceiver of a network node can cause interference at a second transceiver operating in receive mode, when the first and second transceivers operate on the same frequency channel. FIGS. 10 to 12 illustrate respective modes of interference. For the sake of clarity, only relevant transmission paths are illustrated in FIGS. 10 to 12.

In FIG. 10, a first mode of interference is illustrated in which a network node device 60 has a first transceiver 60B operating to transmit in a direction 61B and a second transceiver 60D operating to receive from a direction 61D. When the first and second transceivers 60B and 60D operating in the same frequency channel then it is possible for an interfering signal 64 to be passed from the first transceiver 60B to the second transceiver 60D.

FIG. 11 illustrates intra-network interference in which a first network node device 70 has a transceiver 70B arranged to transmit in a direction 71B. This transmission is intended for a second network node device 80. A third network node device 90 has a transceiver 90D operating in a receiving mode from a direction 91D and expecting to receive transmissions from a fourth network node device 100. The fourth network node 100 has a transceiver 100B operating to transmit in a direction 101B. When the first network node 70 transmits on the same frequency channel as the third network node 90 is receiving then an interfering signal 74 can be transmitted from the first network node device 70 the third network node device 90. Such intra-network interference an occur particularly when the first network node device 70 transmits in advance of the fourth network node device 100.

FIG. 12 illustrates into network interference image a first network node device 110 of a first mesh network 14 has a transceiver 110B arranged to transmit in a direction 111B. This transmission is intended for a second network node device 120 of the first mesh network 14. A third network node device 130, located in a second mesh network 16 has a transceiver 130D operating in a receiving mode from a direction 131D and expecting to receive transmissions from a fourth network node device 140. The fourth network node 140 as a transceiver 140B operating to transmit in a direction 141B. When the first network node 110 transmits on the same frequency channel as the third network node 130 is receiving then an interfering signal 114 can be transmitted from the first network node device 110 the third network node device 130. Such inter-network interference an occur particularly when the first network node device 110 transmits in advance of the fourth network node device 140.

Such interference may be thought of as "structured noise", in that the received signal appears to be acceptable, but has been received from an incorrect transmitter, and so is not, in fact, relevant to the receiver concerned, and should be treated as noise. However, due to the structured nature of the received signal, the receiver can mistake the erroneous signal for a valid start-of-packet signal. Thus, whereas the use of directional antennas may provide improved spatial interference suppression that may allow communication between two transceivers despite potential interference from a third transceiver, a particular issue arises with erroneous detections of the start of data packets from the third transceiver which may be detected as originating from the first transceiver. Thus, the interference suppression may be sufficient to allow communication but insufficient to prevent false detections of new packets.

More specifically, data packets may include a detection data sequence, such as e.g. a preamble. The detection data sequence may be a predetermined data sequence, e.g. selected from a set of predetermined data sequences defined for the communications network. A receiver may use knowledge of such a detection data sequence to determine that a data packet has been received. For example, the receiver may continuously demodulate the received signal and compare it to a local replica of the predetermined data sequence (s), e.g. by correlating demodulated data with stored versions of the predetermined data sequence(s). If a correlation exceeds a given threshold, the receiver may assume that a valid data packet has been received and it may accordingly initiate the process of receiving the data packet.

However, as explained with respect to FIGS. 11 and 12, there is a risk that a transceiver may receive a data packet intended for another transceiver. As such a data packet will also comprise a detection data sequence, this may be detected by the transceiver which will assume that it is receiving a valid data packet and it will initialize reception. Eventually, the transceiver will be able to detect that the data packet is not one intended for the transceiver but as the initialization process tends to be complex, this will typically tend to be a very slow process. Accordingly, interference in the form of a transceiver receiving and detecting a data packet not intended for the transceiver can result in the transceiver being engaged for a long time interval during which it is not able to receive any data packets addressed to it. In practice, this has been found to be an issue even in situations where the interference is reduced sufficiently by the use of directional antennas to allow communication between transceivers.

Thus, start-of-packet interference may be a serious issue for many mesh communication systems.

In accordance with an aspect of the present invention, in order to mitigate, reduce or remove severe start-of-packet interference, a frequency shift (or offset) is deliberately added to the baseband centre frequency $f_0$ for at least one of the pairs of transceivers operating on a given communications channel. The introduced frequency shift is small such that it still allows the signal to be transmitted within the spectrum mask for the channel. Accordingly, the frequency offset or shift may not substantially affect the level of interference between different transceivers. However, by introducing a small frequency offset, it has been found that it is possible to very substantially reduce the risk of false start of packet detections from interfering transceivers.

Respective baseband centre frequencies are allocated to transceivers of the network node devices in the wireless mesh network. The respective baseband frequencies are defined for use with respective communications links of the network. That is, the baseband centre frequencies are designated for particular links between a transmitter in one network node and a receiver in another network node. Each allocated baseband centre frequency is offset from at least one other baseband centre frequency by a respective predetermined offset amount. The predetermined offset amount may be zero for some pairs of communication links, i.e. the same baseband centre frequency may be allocated to some communication links/transceiver pairs. However, for at least two communication links/transceiver pairs a non-zero predetermined offset amount is applied, i.e. at least two communication links/transceiver pairs have different baseband centre frequencies. Allocating different offset amount to different pairs of transceivers serves to reduce or remove the severe start-of-packet interference.

A baseband signal may be a signal which has a centre frequency close to zero and specifically the baseband centre frequency may be much lower than the carrier frequency of the (RF) transmission signal. For example, a baseband signal may be one having a baseband centre frequency at least 10 times lower than a carrier frequency of the transmission signal and/or at least 10 times lower than a centre frequency of a frequency channel in which the transmission signal is transmitted. In many embodiments, the carrier frequency/frequency channel centre frequency be no less than 50 GHz and the baseband signal may be a signal having a baseband centre frequency of less than 250 MHz.

In typical conventional systems, baseband signals are centred at 0 Hz and are directly modulated onto a given carrier signal with a given fixed carrier frequency for the given frequency channel.

In contrast, in the current approach, the base band signals are not all centred around 0 Hz for all transmissions, i.e. the baseband centre frequency is not always equal to 0 Hz. Rather, the approach introduces a variable baseband centre frequency by deliberately adding a frequency shift (or offset) such that the baseband centre frequency $f_0$ will be different from 0 Hz for at least some transmissions. Specifically, a frequency offset relative to 0 Hz is introduced for at least some pairs of transceivers. However, as mentioned, the frequency offset is relatively small relative to the carrier frequency of the transmissions and the frequency channel centre frequencies.

Further, the frequency offsets may be different for different pairs of transceivers, i.e. the baseband centre frequencies may be offset/shifted for different pairs. In some embodiments, a set of frequency offsets may be defined, and the frequency offsets may be allocated to different pairs of transceivers resulting in at least some pairs having different offsets relative to other pairs.

It will be appreciated that different approaches for generating the frequency offsets may be used in different embodiments. An encoded signal may be generated which encodes a data packet using an encoding signal that has a frequency of the baseband centre frequency allocated to the selected pair of transceivers. For example, a baseband signal centred at 0 Hz may be offset to a desired baseband centre frequency by multiplying the signal by a sinewave encoding signal at the baseband centre frequency. This operation may be performed in the encoder unit 32.

The modulation of the baseband signals by the radio frequency carrier signal is independent of the baseband frequency offset, and specifically the radio frequency carrier signal has a frequency which is equal to the centre of the frequency channel in which the data packets are transmitted. Thus, the transmission signals for different transceiver pairs may be transmitted in the same frequency channels but as the baseband centre frequency may vary while the carrier frequency is the same, the signals for different pairs may be (slightly) offset within the frequency channel.

In many embodiments, the allocation of frequency offsets may be such that pairs of transceivers that are likely to interfere with each other are allocated different frequency offsets. Thus, interfering signals within the same frequency channel are likely to be received with frequency offsets within the frequency channel caused by the different offsets to the baseband centre frequency.

Figure 13:
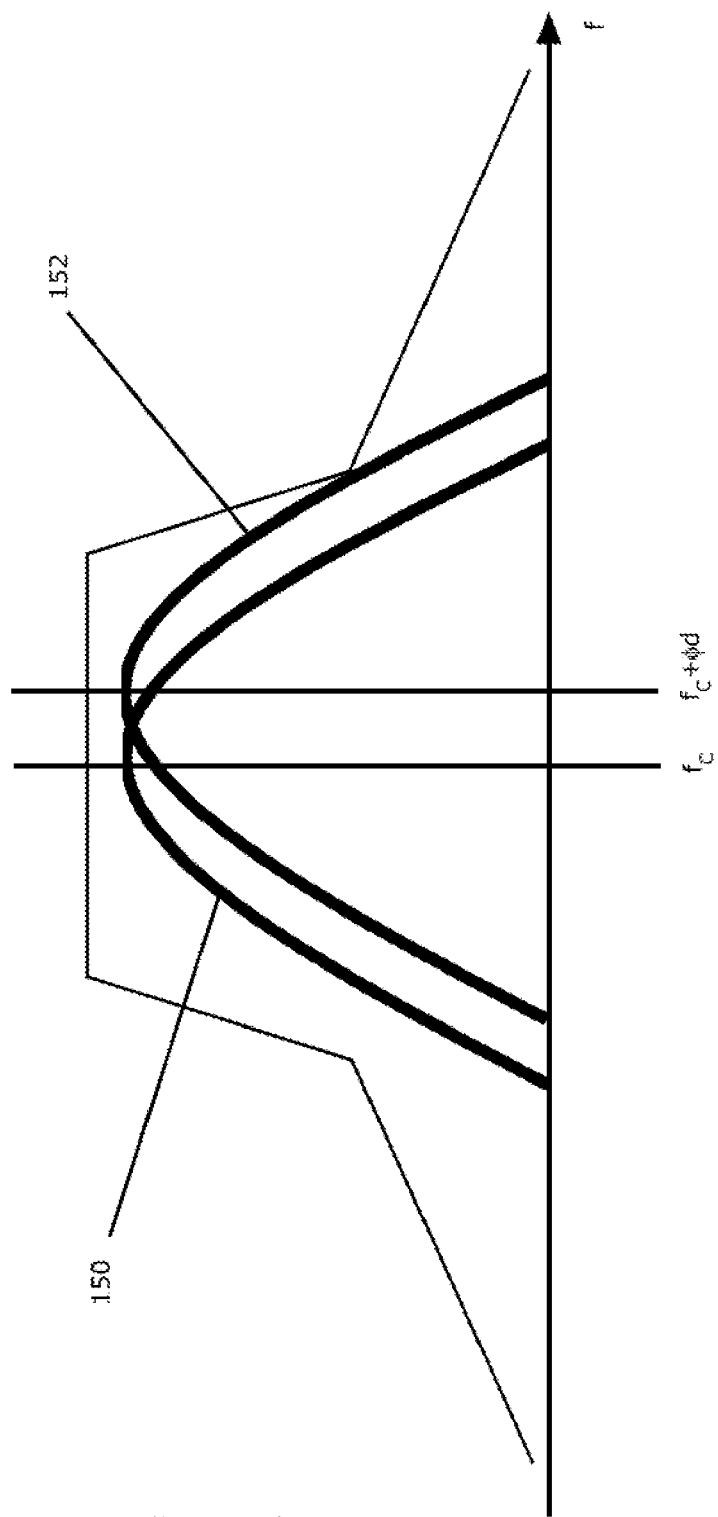
FIG. 13 illustrates modulation of a carrier frequency in accordance with an aspect of the present invention.

Since the data stream is encoded using the baseband frequency signal, as described above (e.g. by introducing a frequency offset by multiplying the data symbols by a sinewave) followed by modulation with a fixed carrier frequency, using different baseband centre frequencies will result in different respective modulated carrier signals for the communications links, i.e. the centre frequency of the modulated signal will vary (slightly) within each frequency channel. FIG. 13 illustrates the modulation of the carrier signal $f_c$ (corresponding to the centre of the frequency channel) with first and second baseband signals, with reference to the carrier spectrum mask 24. The frequency spectra of the resulting modulated carrier signals (the transmission signals) are shown in FIG. 13. A first baseband signal centre frequency results in the first example spectrum 150, and a second baseband signal centre frequency results in the second example spectrum 152. In this present example, the first baseband frequency can be represented as $f_n$ with the second baseband centre frequency being $f_n+\phi_d$ where $\phi_d$ is the applied frequency offset. The modulation of the carrier signal using the different encoded signals (at respective baseband centre frequencies) will result in shifted frequency spectra of the resulting modulated signals, with the spectra being shifted by $\phi_d$. Since the date stream encoding rate is the same in both examples, the resulting modulated carrier signals will be offset from one another by the frequency offset. Such an offset is preferable small in magnitude compared with the centre frequency but is sufficient to provide de-correlation of any interfering start-of-packet signals from a co-channel network node device. Although the two modulated carrier signals 150 and 152 in FIG. 13 overlap in the frequency domain, since the centre frequencies of the respective transmission signals differ, the severe start-of-packet interference can be mitigated or removed. Interference resulting from the overlapping frequency spectra can be mitigated using known noise management techniques, including spatial management using the beamforming directional antenna.

It will be readily appreciated that FIG. 13 illustrates schematically the principle of the technique and is not intended to be interpreted as an accurate representation of any particular baseband centre frequency or carrier frequency.

The different frequency spectra of the modulated carrier signals shown in FIG. 13, will result in encoded signals having different respective baseband centre frequencies following demodulation at the receiver. Such different demodulated encoded signals are illustrated in FIG. 14.

Figure 14:
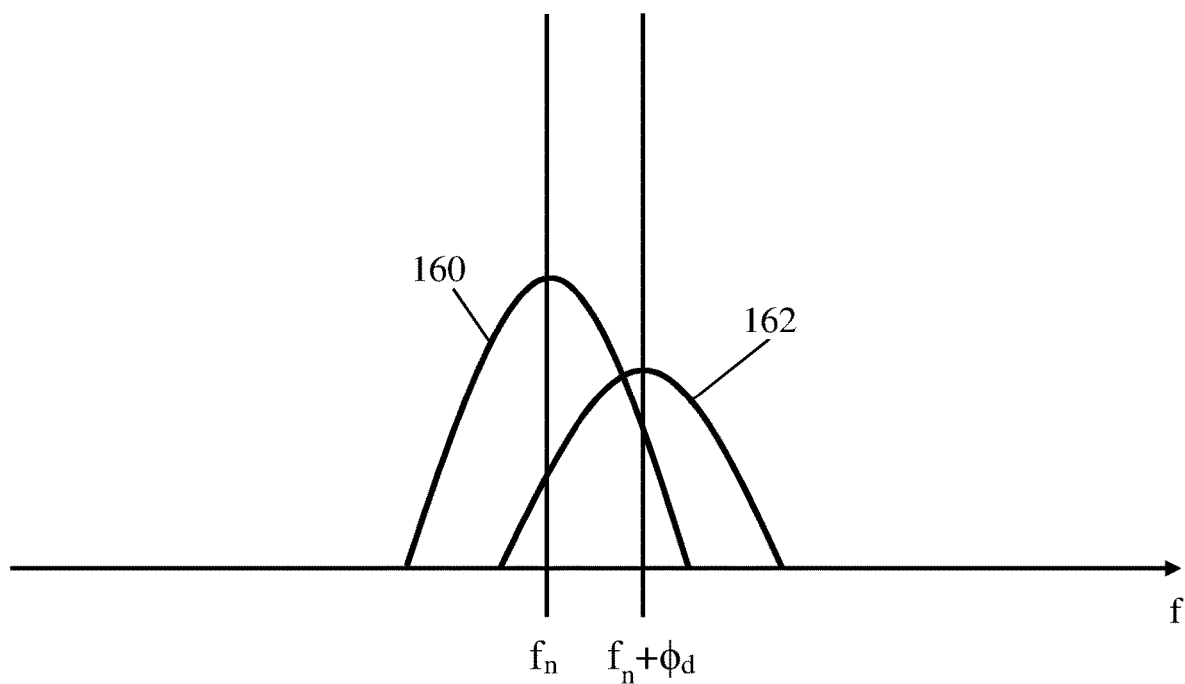
FIG. 14 illustrates interference mitigation according to an aspect of the present invention.

In FIG. 14, a first encoded signal 160 is retrieved and has the baseband centre frequency $f_n$. A second encoded signal 162 is retrieved and has the baseband centre frequency $f_n+\phi_d$, where $\phi_d$ is a predetermined frequency offset amount. The first and second encoded signals 160 and 162 can be seen to be "full-band" encoded signals and make use of the full bandwidth available in the channel spectrum mask 24.

Referring to FIGS. 11 and 12, in the example embodiment of the present invention illustrated in FIG. 14, the first and second transceivers 70B and 80D or 110B and 120D are allocated a baseband centre frequency $f_n$ (offset amount is zero). The third and fourth transceivers 90D and 100B or 130D and 140B are allocated a baseband centre frequency $f_n+\phi_d$ which is offset by a predetermined offset amount $\phi_d$ from the baseband centre frequency $f_n$ allocated to the first and second transceivers.

By using different offset amounts, so that different pairs of transceivers encode at different respective baseband centre, the severe start-of-packet interference can be greatly reduced, since the receiving transceiver will not be able to correlate the incoming interference signal.

In one example, each transmit-receive pair of transceivers are allocated a particular baseband centre frequency which has a predetermined offset from a reference frequency. Such allocation means that transmission between a first transceiver pair will not be detected and decoded by a receiver in a second transceiver pair. Accordingly, it is possible to greatly reduce/remove the issue of severe start-of-packet interference by allocating baseband centre frequencies shifted from one another.

Specifically, the start of a data packet may be based on detecting the presence of a detection data sequence. For a data packet transmitted from the expected transceiver, the offset in baseband centre frequency is known and compensated for in the receiver, and accordingly the detection algorithm, and specifically the correlation of the received data with the local replicas of the detection data sequences, will proceed as for a system not employing any frequency offset. Thus, the detection of a valid data packet from the desired source transceiver will not be impacted and the same detection performance can be achieved.

However, if an interfering data packet is received from another transceiver, this will have a different baseband centre frequency and frequency offset. Accordingly, the operation of the receiver will result in a baseband signal that has an offset relative to 0 Hz even after compensation in the receiver. As a consequence, the detection data sequence of the received data packet will be frequency translated/shifted by a value equal to the difference in the baseband centre frequency of the desired transceiver and the baseband centre frequency of the interfering transceiver.

This frequency offset will effectively result in a different detection data sequence being decoded than the one that was sent. Sampling a received baseband signal at a data rate will for a suitable frequency offset modify the detected data. Accordingly, the frequency offset effectively transforms the received detection data sequence into a different sequence. As this no longer corresponds to the transmitted detection data sequence, and is unlikely to coincidentally match one of the stored detection data sequences, the risk of detecting the interfering signal as a valid detection data sequence may be greatly reduced. Accordingly, the probability of detecting a signal from an interfering transceiver as a valid signal may be substantially reduced.

In many embodiments, the predetermined offset amount and/or the baseband centre frequency is less than 10% (or often 20% or 5%) a symbol rate of the data packet and/or the predetermined offset amount and/or the baseband centre frequency is less than 10% (or often 20% or 5%) a bandwidth of the communication links. The bandwidth of the communication links may be the bandwidth of the frequency channels. A bandwidth may e.g. be a 3 dB or 6 dB bandwidth. Thus, the frequency offsets are kept low which may ensure that the modulated and transmitted signals still fit within the spectrum masks.

Accordingly, in many embodiments, the baseband centre frequencies and the offsets are relatively small compared to the bandwidths of the transmitted signals, as illustrated in FIGS. 13 and 14. This ensures that (almost) the entire available bandwidth of the frequency channels can be used despite allowing for varying centre frequencies. Further, it may improve or increase the effect of the received or detected detection data sequence differing from the transmitted detection data sequence.

However, as also illustrated in FIGS. 13 and 14, the relatively small frequency offsets also result in the desired and interfering signals overlapping substantially in the frequency domain. Accordingly, the described approach may not substantially reduce the overall interference from an interfering signal. Rather, the approach may effectively modify the received detection data sequence thereby preventing that this is detected as being from a valid data packet. In effect, it can be considered that the frequency offset may convert the interfering signal from being an equivalent of a desired data packet to merely correspond to normal noise or stochastic interference. This may provide substantially improved detection robustness and substantially reduce false start of packet initializations.

The system may accordingly provide an enhanced synergistic effect between the use of baseband frequency offsets and the use of beamform directional antennas. The latter may be used to control interference such that this is sufficiently low to allow communication between transceivers, with the baseband frequency offsets providing further protection thereby allowing for this interference to not result in too many false start of data packet detections. Thus, the use of a baseband frequency offset may allow a more relaxed requirement on the interference management performed using beamform antennas.

In many embodiments, the frequency offsets may be selected such that a correlation between a detection data sequence and a detection data sequence frequency shifted by the predetermined frequency offset is substantially reduced. In many embodiments, the frequency offsets may be selected to minimize this correlation and/or to at least reduce it by a substantial factor, such as at least by a factor of 10.

The frequency offsets may be selected such that a detected sequence for a frequency shifted/offset detection data sequence has a correlation with the non-frequency shifted/offset detection data sequence that does not exceed a detection threshold. The frequency offset may e.g. be selected to reduce the correlation by at least a factor of 5 or 10 relative to an autocorrelation for the sequence.

Thus, in some embodiments at least some data packets transmitted in the network comprise detection data sequences for detection of the data packets by a receiver, and the respective predetermined offset amount is (determined/selected) such that a correlation between a detection data sequence and a version of the detection data sequence frequency offset by the respective predetermined offset (e.g. when sampled at the symbol rate of the transmissions/the detection data sequence) is below a detection threshold for the detection data sequences.

In many embodiments, such as some suitable for implementation in an IEEE 802.11ad mesh communication network, it has been found that particularly advantageous performance can be found for a frequency offset of ±125 MHz. The bandwidth for the channels of IEEE 802.11ad are around 2.16 GHz so this corresponds to a frequency offset of around 6% of the bandwidth. This will typically allow the signal to be encompassed within the spectrum mask of the channel.

The frequency allocations may be made in any arbitrary steps from the reference baseband centre frequency.

The baseband centre frequencies may be allocated by a central network resource and may be set on a data packet by data packet basis. Such data packet allocation may be made by a Media Access Controller (MAC) of each network node device.

Such a technique enables reduction of severe start of packet interference when there are few channels to be allocated.

The invention claimed is:

1. A method of mitigating start-of-packet interference in a millimetre waveband wireless mesh communications network which comprises: a first plurality of network node devices each having a transceiver unit which includes a beamforming antenna device, and a second plurality of millimetre waveband wireless communications links each of which interconnects a respective pair of the transceiver units of the network node devices, the method comprising:
   allocating respective baseband centre frequencies to pairs of transceivers of the network node devices, which baseband centre frequencies are for use with respective communications links of the network, each such allocated baseband centre frequency being offset from at least one other allocated baseband centre frequency by a respective predetermined offset amount; and
   at a first transceiver of a selected pair of transceivers, encoding a data packet using an encoding signal having the baseband centre frequency allocated to the selected pair of transceivers, to generate an encoded signal;
   wherein at least some data packets transmitted in the mesh communications network comprise detection data sequences for detection of the data packets by a receiver, and the respective predetermined offset amount is such that a correlation between a detection data sequence and version of the detection data sequence that is frequency offset by the respective predetermined offset is below a detection threshold for the detection data sequence.

2. The method of claim 1, wherein the predetermined offset amount is less than a tenth of a bandwidth of the communication links.

3. The method of 1, wherein the communication links uses single carrier modulation.

4. The method of claim 1, further comprising: at the first transceiver modulating a radio frequency carrier signal with the encoded signal to generate a transmission signal, the modulating applying a frequency translation of the encoded signal by a value equal to a carrier frequency being a centre frequency of a frequency channel of the millimetre waveband wireless mesh communications network.

5. The method of claim 1, further comprising at the first transceiver:

controlling a beamforming antenna device of the transceiver to enable transmission therefrom in a predetermined transmission direction; and
transmitting the transmission signal from the beamforming antenna device in the predetermined transmission direction.

6. The method of claim 1, further comprising, at a second transceiver of the selected pair of transceivers:
receiving the transmission signal at the beamforming antenna of the second transceiver as a received signal;
demodulating the received signal with a radio frequency signal at the carrier frequency, to generate a received encoded signal; and
decoding the received encoded signal using a decoding signal having the baseband centre frequency allocated to the selected pair of transceivers.

7. The method of claim 1, wherein the predetermined offset amount is less than a fifth of a symbol rate of the data packet.

8. The method of claim 1, wherein the step of allocating respective baseband centre frequencies is performed at least partially by a central network resource of the communications network.

9. The method of claim 1, wherein the step of allocating respective baseband centre frequencies is performed at least partially by a media access controller, MAC, of each network node device.

10. A millimetre waveband wireless mesh communications network comprising:
a first plurality of network node devices each having a transceiver unit which includes a beamforming antenna device;
a second plurality of millimetre waveband wireless communications links which interconnect respective pairs of transceiver units of the network node devices; and
a baseband centre frequency allocation unit operable to allocate respective baseband centre frequencies to pairs transceivers of the network node devices, which baseband centre frequencies are for use with respective communications links of the network, each such allocated baseband centre frequency being offset from at least one other allocated baseband centre frequency by a respective predetermined offset amount,
wherein a first transceiver of a selected pair of transceivers is operable to encode a data packet using an encoding signal having the baseband centre frequency allocated to the selected pair of transceivers, to generate an encoded signal; and
at least some data packets transmitted in the mesh communications network comprise detection data sequences for detection of the data packets by a receiver, and the respective predetermined offset amount is such that a correlation between a detection data sequence and version of the detection data sequence that is frequency offset by the respective predetermined offset is below a detection threshold for the detection data sequence.

11. The millimetre waveband wireless mesh communications network of claim 10, wherein the predetermined offset amount is less than a tenth of a bandwidth of the communication links.

12. The millimetre waveband wireless mesh communication network of claim 10, wherein the first transceiver of the selected pair of transceivers is further operable to modulate a radio frequency carrier signal with the encoded signal, to generate a transmission signal, to control a beamforming antenna device of the transceiver to enable transmission therefrom in a predetermined transmission direction; and to transmit the transmission signal from the beamforming antenna device in the predetermined transmission direction.

13. The millimetre waveband wireless mesh communication network of claim 10, wherein a second transceiver of the selected pair of transceivers is operable to receive such a transmission signal at the beamforming antenna of the second transceiver as a received signal, to demodulate such a received signal with a radio frequency signal at the carrier frequency, to generate a received encoded signal, and to decode such a received encoded signal using a decoding signal having the baseband centre frequency allocated to the selected pair of transceivers.

14. The millimetre waveband wireless mesh communication network of claim 10, wherein the baseband centre frequency allocation unit is at least partially provided by a central network resource.

* * * * *